INVENTOR
RICHARD A. CHAPMAN

ATTORNEY

Feb. 2, 1971    R. A. CHAPMAN    3,560,873
LASER HAVING A POPULATION INVERSION BETWEEN STATES OF
A MERCURY DOPANT IN A GERMANIUM SAMPLE
Filed July 5, 1967    2 Sheets-Sheet 2

INVENTOR
RICHARD A. CHAPMAN

ATTORNEY

United States Patent Office 3,560,873
Patented Feb. 2, 1971

3,560,873
LASER HAVING A POPULATION INVERSION BETWEEN STATES OF A MERCURY DOPANT IN A GERMANIUM SAMPLE
Richard A. Chapman, Dallas, Tex., assignor to Texas Instruments Incorporated, Dallas, Tex., a corporation of Delaware
Filed July 5, 1967, Ser. No. 651,259
Int. Cl. H01s 3/18
U.S. Cl. 331—94.5    4 Claims

ABSTRACT OF THE DISCLOSURE

A mercury-doped germanium sample is mounted in close thermal contact with the bottom of a liquid helium filled Dewar. Infrared transmitting windows such as potassium bromide are provided in the Dewar to permit pumping and lasing radiation to pass into and out of said Dewar. The mercury-doped germanium has a split ground state with the upper split off state being depopulated by cooling the sample to about 5° K. A population inversion between the split off ground state and the effective mass excited states of the mercury-doped germanium sample can be obtained by infrared pumping using a $CO_2$ laser beam which has a wavelength of about 10.6 microns and photon energies of 117 millielectron volts. Since ground states binding energy of the mercury impurity is about 91.5 millielectron volts, thermal heating of the sample is minimized by using a $CO_2$ laser since the excess kinetic energy of the photo-generated carrier is on the order of 26 millielectron volts.

---

This invention relates to a semiconductor laser, and more particularly to a laser of a semiconductor material doped with a large number of majority carriers and operated at a temperature such that most of the dominant impurity atoms are neutral in thermal equilibrium.

Stimulated emission was first observed in a semiconductor material in 1962. Since then lasing action has been observed in many other such materials and considerable progress has been made in the field of semiconductor lasers. In the earlier experiments with semiconductor lasers, lasing operation was demonstrated at wavelengths on the order of 8400 angstroms, using a GaAs cube 0.4 mm. on a side maintained at a temperature of 77° K. As As the state of the art of semiconductor lasing progressed, the wavelength of coherent radiation has been extended through the visible into the ultraviolet and out to the far infrared using various semiconductor type materials. The present invention relates to a solid-state laser emitting radiation in the infrared region.

Basically, the essence of laser operation lies in stimulated emission achieved by a population inversion between at least two energy states, such as between state "$a$" and state "$b$," of a material system. Lasing action is produced at a photon enerby $E_{ab}$ equal to the energy separation of the two states. A population inversion occurs when the number of centers in the less tightly bound state "$a$" exceeds the number of centers in the more tightly bound state "$b$"; this imbalance is the opposite of that which occurs in thermal equilibrium. One method of producing a population inversion is to pump the material system into a higher energy state through the absorption of photons of energy greater than $E_{ab}$. Neither of the energy states "$a$" nor "$b$" are required to be in the initial or final state for the pumping process, but may be in intermediate states. A population inversion occurs between state "$a$" and state "$b$" if the lifetime for the decay between these two states is relatively long, typically, $\tau$ greater than $10^{-4}$ seconds, and the pumping rate is sufficiently large. When a population inversion takes place between states "$a$" and "$b$," the number of photons of energy $E_{ab}$ increases in passing through the material system. This gain in the number of photons of energy $E_{ab}$ is amplified to produce high intensity coherent radiation (i.e. lasing action) at the photon energy if the material system is placed in a resonant structure from which only a small fraction of the photons of energy $E_{ab}$ escape in a direction normal to the resonator faces.

Several pumping schemes have been employed to produce lasing action in semiconductor materials including: majority carrier injection at a p-n junction, injunction by means of an external electron beam, and optical pumping through band-to-band photo absorption. Optical pumping excites the semiconductor sample by radiation with photons having energies greater than the energy represented by the gap between energy states. The high energy photons penetrate several microns into the material (depending upon their energy) thereby giving up a large fraction of their energy. Population inversion and lasing action have been observed from band-to-band and band-to-impurity transitions and between two charged states of a double acceptor using a $p^+$–$p$ junction between the heavily doped $p^+$ region and a lightly doped p region as rescribed in the U. S. Pat. No. 3,258,718.

In accordance with this invention, a large number of majority carriers are introduced into an impurity doped semiconductor maintained at a temperature low enough to insure that most of the dominant impurity atoms are neutral in thermal equilibrium. These non-equilibrium majority carriers are captured by an ionized species of the dominant impurity with the result that the excited inpurities (formed after the capture of the carrier) will de-excite to the neutral ground state with the emission of a photon. The dominant impurity is relatively tightly bound so that the energy of its ground state is separated from the loosely bound effective mass excited states. This large separation significantly increases the probility a radiative de-excitation of an impurity from the excited states to the ground state. This is in contrast to the probability of non-radiative de-excitation described by M. Lax in the technical publication "Physical Review," volume 119, published in 1960. A semiconductor laser mounted in a low temperature Dewar and constructed with partially transmitting optically parallel surfaces which face infrared transmitting windows of the Dewar acts as a three-level infrared laser when the rate of introduction of majority carriers is larger than a certain threshold rate.

In accordance with another aspect of the invention, there is provided a semiconductor laser having a dominant impurity which has a split ground state, preferably an inherent feature of the impurity center. However, a split ground state may also be obtained through the application of uniaxial stress or a magnetic field. A semiconductor laser having a dominant impurity with a split ground state has four energy states. A four-level laser has a lower lasing threshold when the temperature is maintained at a point such that the less tightly bound split off ground state is thermally depopulated. Spontaneous ground state splitting has been observed in mercury-doped germanium and has been predicated for zinc-doped silicon. Relatively tightly bound impurity centers may be obtained in silicon through the introduction of large atomic number impurities and/or impurities from Groups I, II, III, V, or VI of the Periodic Table, and in germanium through the introduction of impurities of Groups I, II, or VI.

In a more specific aspect of the invention, there is provided a solid-state laser including a semiconductor sample doped with an impurity having a ground state separated from the excited states of the same impurity and having two opposed partially reflective surfaces ground parallel and polished to define a resonator for the infrared radiation, and means for introducing an excess of majority carriers to achieve a population inversion between impurity states of different binding energy but of the same charge state thereby causing stimulated radiation emission.

A feature of the invention is providing a semiconductor laser wherein the majority carriers and dominant impurities of the material system have major roles in producing lasing action.

Another feature of the invention is providing a semiconductor laser wherein the optical transitions that are of importance occur between states of an impurity for which both states have the same charge.

A further feature of the invention is providing a semiconductor laser wherein the impurities introduced into the semiconductor material have a ground state that is tightly bound and have a large energy separation between the ground state and the excited state.

Yet another feature of the invention is providing a semiconductor laser wherein four energy states are produced using an impurity with an inherently split ground state or where ground state splitting is produced by an external means.

A more complete understanding of the invention and its advantages will be apparent from the specification and claims and from the accompanying drawings illustrative of the invention.

Referring to the drawings.

Figure 1:
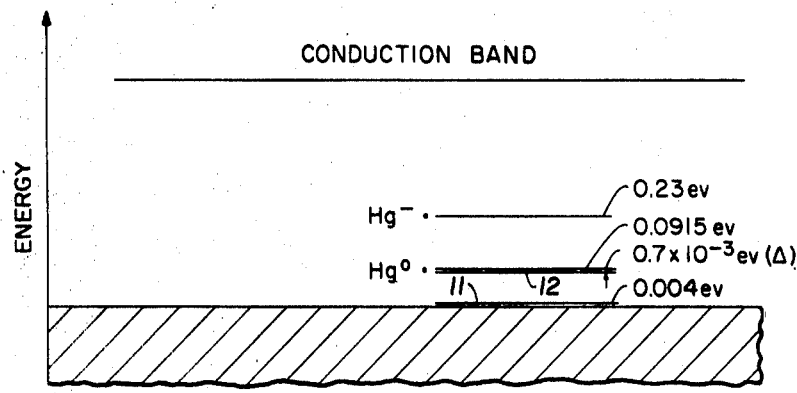
FIG. 1 is a schematic of the conduction and valence bands in a semiconductor material including the neutral and singly ionized ground states of a mercury center.

Referring to FIG. 1, there is shown the conduction bands of a typical semiconductor material including the higher energy conduction band and the lower energy valence band separated by a band-gap in which no allowed states are possible in the perfect semiconductor. For germanium, the conduction band is approximately 0.6 electron volt above the valence band. The mercury impurity in germanium can produce either of two ground states of different charge depending on the number of the compensating donors. If the number of mercury impurities $N_{Hg}$ is much larger than the number of donors $N_d$, a neutral ground state will be produced separated from the valence band edge by 0.0915 electron volt. If $N_d$ is much greater than $N_{Hg}$, mercury will be present in its singly ionized ground state separated from the valence band edge by 0.23 electron volt. This exhibition of two charge states is a characteristic of a double acceptor provided by a Group II impurity in a Group IV semiconductor. To a limited extent, these two charge states are analogous to the two ionization states of atomic helium. The mercury center in each of the ionization states displays a number of excited states. The excited states of the individual centers are displaced a few millielectron volts from the valence band edge as shown by the line 11 of FIG. 1 for the center at the 0.0915 electron volt level. This discussion will proceed considering only the 0.0915 electron volt level.

To induce coherent radiation from a doped semiconductor sample, it is necessary to produce a population inversion between appropriately spaced excitation states. For a three-level laser having an excitation level distribution such as shown in FIG. 1, the first state is the ground state at 0.0915 electron volt, the second state is the valence band, and the third state is the excitation state identified by the line 11, a population inversion must be made to take place between the excitation state (state three) and the ground state (state one). At thermal equilibrium, the number of centers in state one is approximately equal to the total number of centers so that to produce a population inversion requires more than one-half of all available centers to be excited into state three. One of the sources considered for producing a population inversion in the mercury center in germanium is to irradiate the sample with infrared radiation having photon energies greater than 0.0915 electron volt. The sample is maintained at a temperature such that, in the absence of the infrared radiation, the majority of mercury centers would be neutral. During the irradiation of a sample, a series of processes have been known to occur. These processes are: majority carriers (holes) are created due to absorption of a photon by an unexcited neutral mercury center, a hole is captured by an ionized mercury center, and the excited neutral mercury center formed by the capture process is de-excited to finally produce another unexcited neutral mercury center.

The condition for neutrality of the mercury center requires that the temperature be kept on the order of 40° K. and that the number of donors present in the germanium be much less than the number of mercury impurities present.

To produce a free hole from the neutral mercury center in germanium requires a photon having an energy greater than 0.095 electron volt, known as the threshold level. It has been found that the energy of the 10.6 micron (117 millielectron volts) photon from a $CO_2$ laser is great enough to produce free holes from the neutral mercury centers in germanium. Of equal importance, this energy is also close to the energy for maximum photon absorption (150 millielectron volts) of the neutral mercury center. Furthermore, germanium is transmissive to wavelengths well beyond fifteen microns 82 millielectron volts) so that the pumping process is efficient with the result that there is little photon loss. A hole created in this process quickly dissipates its kinetic energy (approximately 26 millielectron volts) to the germanium and slows down. The excess energy loss by the hole goes into heating the germanium sample.

In the second process, which takes place during or after the kinetic energy loss by the hole, a hole is captured by a negatively ionized mercury center which was present due to residual compensation or was created by photo ionization of a neutral center by the photons of the infrared radiation, that is the pumping process. This capture process has been identified as that described by M. Lax in which the mercury center is neutral but in a highly excited state after the capture event. Consequently, the excited center emits acoustic phonons and rapidly de-excites non-radiatively. It is here that the large energy separation between the impurity ground state and the first excited state becomes important. If this separation is much larger than the maximum phonon energy in the lattice (37 millielectron volts in germanium), only multiple phonon emission events will be possible and the non-radiative lifetime is lengthened. Furthermore, the radiative lifetime decreases with increasing energy separation which is desired. For example, in mercury-doped germanium, a detailed balance calculation using photo excitation cross sections indicates that the electric dipole lifetime for de-excitation from the excited to the ground state of the mercury center is on the order of $10^{-4}$ seconds. Lasing action is known to have been obtained even if the non-radiative lifetime is shorter than or comparable to the radiative lifetime, but in such a case the laser is somewhat inefficient and requires large pumping power.

Figure 2:
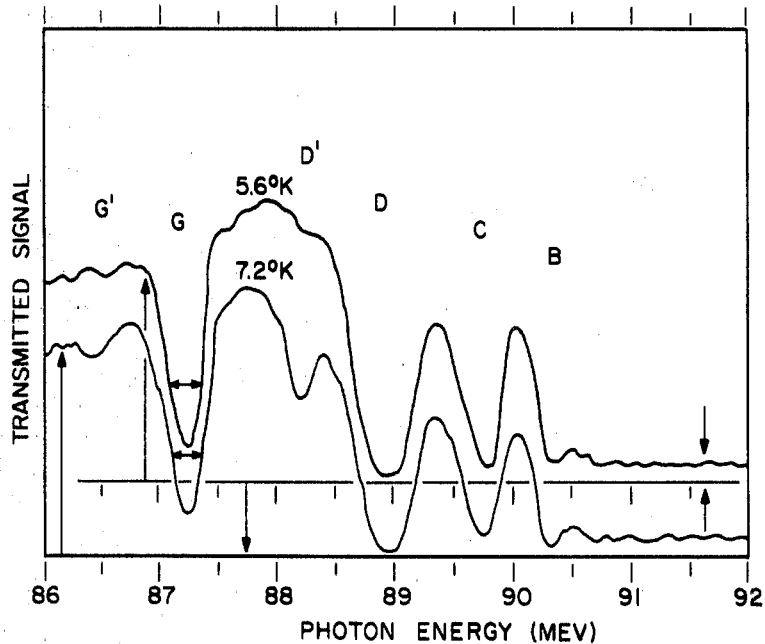
FIG. 2 is a plot of absorption coefficient versus photon energy for a mercury-doped germanium sample at two temperature levels.

To reduce the number of mercury centers which must be excited, the ground state splitting, as shown by line 12 of FIG. 1, becomes important. Splitting of the ground state of the neutral mercury two-hole acceptor is evident from the considerable decrease in inttensity of two of the photo absorption peaks shown in FIG. 2. The curves of FIG. 2 show the depopulation of the less tightly bound ground state as the result of lowering the temperature of the mercury-doped germanium sample from 7.2° K. to 5.6° K. The curves of FIG. 2 are the result of experiments carried out on a 1.5 centimeter sample of mercury-doped germanium containing about $1.2 \times 10^{16}$ mercury atoms/cm.$^3$. The lower temperature curve is displaced vertically for purposes of clarity. Although the curves of FIG. 2 show the absorption coefficients of a mercury-doped germanium sample, they also explain the depopulation of the less tightly bound ground state which is essential to reduce the number of mercury centers which must be excited. The splitting of the lowest level of the two-hole configuration arises because of the difference in the electrostatic interaction energy between holes. Ground state splitting on the order of 0.7 millielectron volt has been observed in mercury-doped germanium. Theoretical predictions are that this splitting is a many body effect which is common to double and triple acceptors (impurities from Columns I and II of the Periodic Table) and should increase with increasing binding energy. However, the ground splitting cannot be so large that the split off state and the excited states are so close that non-radiative recombinations become excessive.

Figure 3:
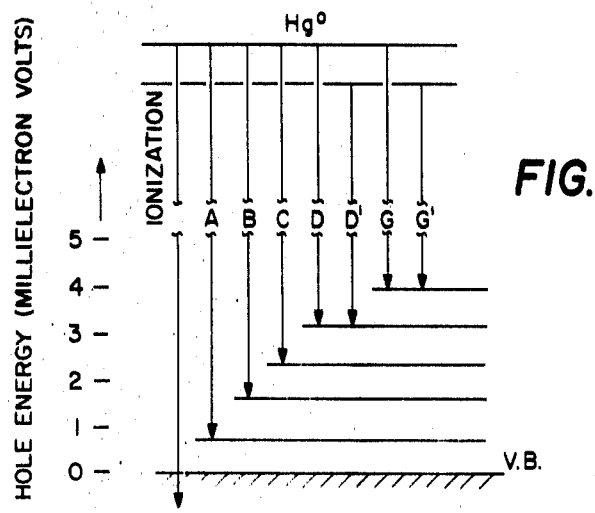
FIG. 3 is a schematic of energy levels from the split ground state of a mercury-doped sample to excited states near the valence band.

FIG. 3 shows the correlation between the split ground state and the excited states between line 11 and the edge of the valence band as shown in FIG. 1. As a result of the ground splitting action, the D' and G' transitions terminate on the same excited states as the D and G transitions, respectively. The D' and G' transitions decrease in intensity because of the reduced population of the least bound initial state.

Because of the ground state splitting of the mercury center, the pumping required to obtain a population inversion is significantly reduced from that for the three-level laser described previously. The result is a four-level laser with the initial ground state designated as state one, the valence band edge designated as state two, the energy represented by line 11 as state three, and the energy represented by line 12 as state four. The relation between the equilibrium carrier population $N_1$, for state one, and $N_4$, for state four, is given by the equation:

$$N_4 = N_1 e^{-\frac{\Delta E}{kT}}$$

where
$N_4$ is the number of carriers in state four,
$N_1$ is the number of carriers in state one,
$\Delta E$ is the energy difference between the two levels
T is the temperature of the sample in degrees Kelvin, and
$k$ is Boltzmann's constant.

From this equation it can be sene that the pumping energy required for lasing action is related to the energy difference between states one and four. The carrier population of state four can be made much less than the carrier population of state one by reducing the sample temperature to about 7° K. such that T is less than $\Delta E/k$. Thus, a threshold condition is easier to obtain than for a three-level laser since in the three-level laser the population inversion had to be made to take place between state three and state one, and now, for a population inversion, the carrier population of state three need only exceed the carrier population at state four. Thus, in the four-level laser concept, only a small fraction of the mercury centers need to be excited into state three.

Figure 4:
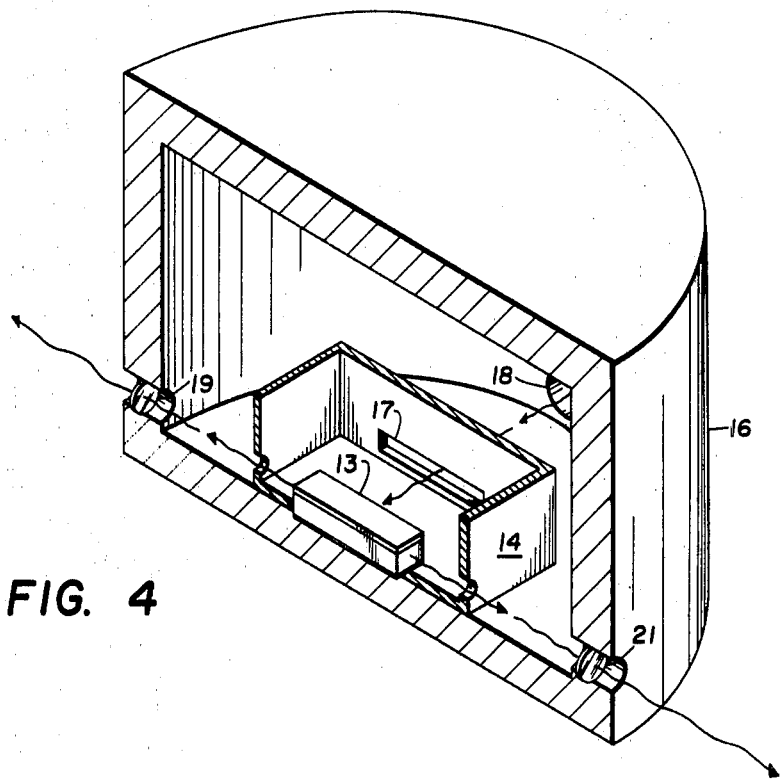
FIG. 4 is a sketch of an arrangement used for generating lasing action in a mercury-doped germanium sample.

Referring to FIG. 4, there is shown a mercury-doped germanium sample 13 mounted in a jig 14 having a good coefficient of thermal conduction mounted to a cold finger or the bottom of a liquid helium filled Dewar 16. A large aperture 17 is provided in the side of the jig 14 to insure that the pumping radiation floods the entire germanium sample. Under certain conditions, it is necessary to provide a cold filter over the aperture 17. Pumping radiation is supplied to the jig through a potassium bromide window 18. The radiation emitted from the mercury-doped germanium sample is transmitted from the Dewar by means of potassium bromide windows 19 and 21.

The mercury-doped germanium sample 13 is fabricated by a single pass of a melted zone of germanium through a single crystal germanium sample held in a quartz boat enclosed in a sealed mercury containing capsule. The mercury-doped germanium sample is a single crystal with dislocation densities of about $10^3$ per cm.$^2$ on the (111) face and mercury concentrations of $10^{15}$ per cm. to $10^{16}$ per cm., depending upon the mercury pressure used during crystal growth. The mercury-doped germanium sample is cut and polished with optically parallel faces separated, for example, by 0.5 cm. or 1.5 cm.

Pumping radiation for the mercury-doped germanium sample 13 is preferably at long wavelengths (shorter than 13.5 microns) to prevent overheating of the sample since all energy associated with photon energies greater than approximately 91 mev. are dissipated as heat in the sample. A $CO_2$ laser is ideal since its wavelength is 10.6 microns or 117 mev. Thus, the thermal heating of the sample will be minimized since the excess kinetic energy of the photo generated carrier is only 117 mev.−91 mev., or 26 mev. The $CO_2$ laser generates its high power output by virtue of having a particularly long-lived vibrational state that constitutes the upper energy level, and several available lower state vibrational levels that can decay radiatively to the ground state. The power output of the $CO_2$ laser is more than sufficient to cause a population inversion in the mercury-doped germanium sample. A typical mixture for the gas of such a laser is approximtely one Torr $CO_2$, one Torr N, and five Torr helium.

In a typical embodiment of the invention, a mercury-doped germanium sample is mounted in the copper jig 14 with the polished parallel reflective surfaces in line with the potassium bromide windows 19 and 21. A $CO_2$ laser supplies optical pumping energies at a wavelength of about 10.6 microns through the potassium bromide window 18 to cause a population inversion between the first excited state represented by line 11 of FIG. 1 and the split ground mercury center represented by line 12. The Dewar 16 is filled with liquid helium and maintains the sample at a temperature of about 4.2° K. The emitted radiation from the mercury-doped germanium sample is on the order of fourteen microns. Instead of $CO_2$ laser pumping, a strong Globar or Nernst Glower source, filtered to pass wavelengths longer than ten microns, could be used for optical pumping. If the germanium sample is uniaxially strained, it is possible to increase the sample temperature to a more convenient range, such as 20°–30° K.; or alternately to decrease pumping power.

As discussed previously, theoretical predictions are that ground state splitting is a many body effect which is common to double and triple acceptors (Columns I and II impurities, respectively) and should increase with increasing binding energy. For this and other reasons, the double acceptors in silicon are attractive because of their greater binding energies in silicon. Zinc-doped silicon, for example, is another material capable of lasing in the infrared region. For a zinc-doped silicon sample, the ground state binding energy is about 0.3 electron volt and lasing occurs near the four micron region. Zinc in silicon is particularly attractive because it is a double-acceptor which is tightly bound. The significance of this is that the ground state splitting of zinc in silicon will be larger than mercury in germanium; thus, population inversion and lasing could be obtained at higher temperatures than for a mercury-doped germanium sample. For a silicon doper laser, optical pumping can be achieved by a helium-neon laser radiating at a wavelength of about 3.4 microns.

Figure 5:
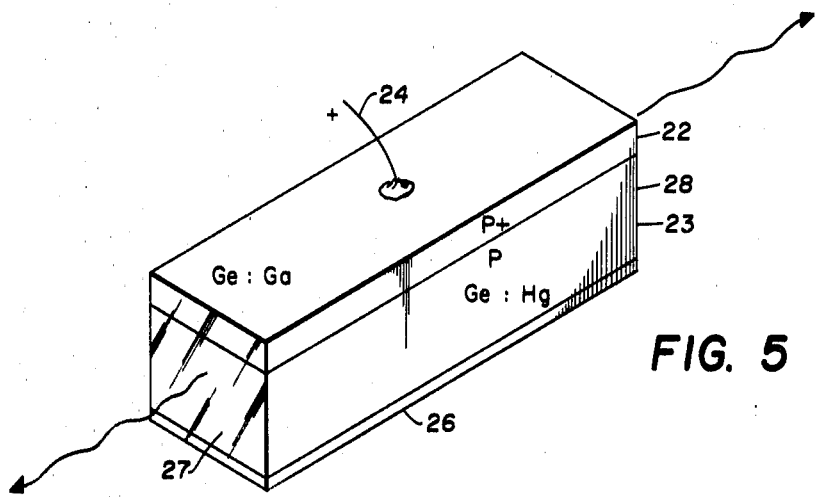
FIG. 5 is a schematic of a junction-type split ground state semiconductor laser.

It is not intended that the invention be limited to bulk samples; it also applies to a junction sample semiconductor laser. Referring to FIG. 5, there is shown a junction sample including a p portion 23 of mercury-doped germanium and a p+ portion 22 of gallium-doped germanium. The p+ region contains a large concentration of loosely bound acceptors such as produced by boron or gallium in germanium and the p region contains the tightly bound impurity such as obtained by the introduction of Group I or II impurities in germanium. Majority carriers are introduced into the p region by forward biasing the p+—p junction through the contacts 24 and 26 positioned at right angles to the parallel partially reflective surfaces 27 and 28. Introduction of excess majority carriers causes spontaneous emission of photons resulting from transitions between impurity states of different binding energies but of the same charge state resulting in an infrared emitter. A population inversion between impurity states of different binding energy but of the same charge state can also be achieved by the introduction of majority carriers into the p region to cause stimulated emission of photons resulting from transitions between said energy states. The sample will then lase, producing infrared emission at a wavelength fixed by the transition energy. Where ground state splitting is observed, the upper split off state can be depopulated by cooling the sample to about 5° K.

While several embodiments of the invention, together with modifications thereof, have been described in detail herein and shown in the accompanying drawings, it will be evident that various further modifications are possible in the arrangement and construction without departing from the scope of the invention.

I claim:

1. A semiconductor laser comprising:
a mercury-doped germanium sample having a split mercury impurity ground state separated from the mercury excited states and having two opposed partially reflective surfaces ground parallel and polished to define a resonator for the infrared radiation, and means for optically pumping said mercury-doped germanium sample to achieve a population inversion between mercury impurity states of different binding energy but of the same charge to thus cause stimulated emission of photons resulting from transitions between said energy states to produce infrared emission at wavelength fixed by the transition energy.

2. A semiconductor laser as set forth in claim 1 wherein said optical pumping means is an infrared laser radiating at a wavelength of about 10.6 microns.

3. A semiconductor laser as set forth in claim 1 wherein said optical pumping means is a laser radiating at a wavelength slightly less than the photo ionization threshold wavelength of mercury in germanium.

4. A semiconductor laser as set forth in claim 1 including means for maintaining the temperature of said mercury-doped germanium sample such that most of the dominant impurity atoms are neutral in the absence of pumping.

References Cited

UNITED STATES PATENTS

| | | | |
|---|---|---|---|
| 3,059,117 | 10/1962 | Boyle et al. | 331—94.5 |
| 3,258,718 | 6/1966 | Zeiger et al. | 331—94.5 |

OTHER REFERENCES

Chapman et al.: Bull. Am. Phys. Soc., vol. 11, p. 53, January 1966.

RONALD L. WIBERT, Primary Examiner

E. S. BAUER, Assistant Examiner